United States Patent
Farrahi Moghaddam et al.

(10) Patent No.: US 10,855,650 B2
(45) Date of Patent: Dec. 1, 2020

(54) GENERATING UNIQUE RANDOM STRINGS AS ELEMENT IDENTIFIERS

(71) Applicant: Telefonaktiebolaget LM Ericsson (publ), Stockholm (SE)

(72) Inventors: Reza Farrahi Moghaddam, Brossard (CA); Yves Lemieux, Kirkland (CA); Daniel Migault, Montreal (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 29 days.

(21) Appl. No.: 16/310,584

(22) PCT Filed: Jun. 17, 2016

(86) PCT No.: PCT/IB2016/053631
§ 371 (c)(1),
(2) Date: Dec. 17, 2018

(87) PCT Pub. No.: WO2017/216614
PCT Pub. Date: Dec. 21, 2017

(65) Prior Publication Data
US 2019/0342261 A1    Nov. 7, 2019

(51) Int. Cl.
*H04L 29/12* (2006.01)
*G06F 7/58* (2006.01)
(Continued)

(52) U.S. Cl.
CPC .......... *H04L 61/2092* (2013.01); *G06F 7/582* (2013.01); *H04L 61/2007* (2013.01);
(Continued)

(58) Field of Classification Search
CPC ............ H04L 41/0213; H04L 61/6022; H04L 61/2092; H04L 61/2038; H04L 61/2007;
(Continued)

(56) References Cited

U.S. PATENT DOCUMENTS

| 8,356,173 B2 | 1/2013 | Jiang et al. |
| 8,369,329 B2 | 2/2013 | Koehler, Jr. et al. |

(Continued)

FOREIGN PATENT DOCUMENTS

WO    97/36406 A1    10/1997

OTHER PUBLICATIONS

International Search Report and Written Opinion of the International Searching Authority dated Feb. 16, 2017 issued in corresponding PCT Application No. PCT/IB2016/053631, consisting of 12 pages.
(Continued)

*Primary Examiner* — Jungwon Chang
(74) *Attorney, Agent, or Firm* — Christopher & Weisberg, P.A.

(57) ABSTRACT

A method, node and identifier authorizing entity for generating a unique identifier at a node in a hierarchal tree having a plurality of nodes, the hierarchical tree arranged in a plurality of levels. The method includes obtaining a first limit condition from a higher level node of the plurality of nodes in the hierarchal tree, generating the identifier, applying a function to the generated identifier, verifying that an output of the function satisfies the limit condition, determining a second limit condition for at least one lower level node of the plurality of nodes in the hierarchal tree, and sending the second limit condition to the at least one lower level node of the plurality of nodes in the hierarchal tree.

30 Claims, 5 Drawing Sheets

(51) Int. Cl.
   *H04L 12/24* (2006.01)
   *H04L 12/26* (2006.01)
   *H04L 12/743* (2013.01)

(52) U.S. Cl.
   CPC ........ *H04L 61/2038* (2013.01); *H04L 41/044* (2013.01); *H04L 43/0817* (2013.01); *H04L 45/7453* (2013.01); *H04L 61/6004* (2013.01)

(58) Field of Classification Search
   CPC ... H04L 45/00; H04L 61/6004; H04L 41/044; H04L 43/0817; H04L 45/7453; G06F 7/582
   See application file for complete search history.

(56) References Cited

U.S. PATENT DOCUMENTS

| | | | |
|---|---|---|---|
| 8,619,995 | B2 | 12/2013 | Haddad et al. |
| 2009/0052448 | A1* | 2/2009 | Ramakrishnan .... H04L 12/1886 370/390 |
| 2009/0154476 | A1* | 6/2009 | Kobara ............. H04L 29/12254 370/400 |
| 2009/0157700 | A1* | 6/2009 | Van Vugt ............ H04L 41/0213 |
| 2013/0028411 | A1 | 1/2013 | Arkko et al. |
| 2013/0344903 | A1* | 12/2013 | Li ........................... H04W 4/08 455/458 |
| 2015/0149633 | A1 | 5/2015 | Foti |
| 2015/0350022 | A1* | 12/2015 | Lee ......................... H04L 45/00 709/226 |
| 2016/0036764 | A1* | 2/2016 | Dong .................. H04L 61/6022 370/254 |
| 2016/0112367 | A1* | 4/2016 | Thubert .............. H04L 12/1886 370/254 |

OTHER PUBLICATIONS

Bernardos M. Calderon UC3M C: "Survey of IP Adddress Autoconfiguration Mechanisms for MANETs draft-bernardos-manet-autoconf-survey-00.t xt", Internet Engineering Task Force, IETF; Internet Society; Geneva, Switzerland; Jul. 11, 2005, consisting of 25 pages.

Li-Hsing Yen: "Flexible Address Configurations for Tree-Based ZigBee/IEEE 802.15.4 Wireless Networks"; 22nd International Conference on Advanced Information Networking and Applications, Mar. 25, 2008, consisting of 8 pages.

Reza Farrahi Moghaddam: "SmartRegion: A Region-based, Distributed Approach to Software-Defined Networks (SDNs)"; Int. J. of Communication Networks and Distributed Systems, 2015, consisting of 27 pages.

* cited by examiner

GENERATING UNIQUE RANDOM STRINGS AS ELEMENT IDENTIFIERS

CROSS-REFERENCE TO RELATED APPLICATIONS

This application is a Submission Under 35 U.S.C. § 371 for U.S. National Stage Patent Application of International Application Number: PCT/IB2016/053631, filed Jun. 17, 2016 entitled "GENERATING UNIQUE RANDOM STRINGS AS ELEMENT IDENTIFIERS," the entirety of which is incorporated herein by reference.

TECHNICAL FIELD

This disclosure relates to wireless communications, and in particular to a method, node, and identifier authorization entity for generating identifiers for nodes in a hierarchal tree that are unique across domains.

BACKGROUND

In the context of the Internet of Things ("IoT"), it is often desirable to provide a way to generate and distribute identifiers, such as a key, a name, or an address, that are unique across domains. In other words, the identifier will not be shared between two different domains. In certain instances, interference or collision between identifiers may occur within a domain. The probability of collision depends on the number of devices within the IoT and the size of the generated identifier. There is little that can be done regarding the number of devices over the Internet, as these devices are not kept under control. For the same reason, the appropriated size of the identifier cannot be fixed and kept under control. As a result, a challenge is to be able to isolate the environment from the rest of the Internet so that the collision probability inside a given domain can be kept low or at least controlled. It is the responsibility of the domain to ensure the uniqueness of the generated identifier within its domain.

Generated keys are assumed to be kept private. In order to enforce this privacy, keys are often generated by the devices themselves, and the devices are then responsible for not leaking the key. Avoiding a centralized solution as a way of generating keys, avoids the scenario where one central entity gains control of the keys. However, such an architecture may result in two different entities generating the same key, which could result in impersonation attacks. A central entity requires trust with the assignment authority, requires additional exchanges and does not scale well with the billions of IoT devices.

A new paradigm of the IoT is that keys should remain relatively small, and the number of IoT devices is expected to increase in the future. Thus, one can no longer assume the uniqueness of a private key. Therefore, current approaches of either generating and distributing a central key or generating a decentralized key without any control of their uniqueness, are inadequate.

In the context of internet protocol (IP) address assignment, it is also a requirement that the generated address be unique while at the same time also being organized and traceable. After generation of the IP address, there needs to be a mechanism for checking to assure that there is no duplication or collision before using the IP address. Current mechanisms are complex, and require extra packet exchange which may be impractical in the context of the IoT devices where limited resources are available.

SUMMARY

Some embodiments of the present disclosure advantageously provide a method, node, and identifier authorizing entity for generating a unique identifier at a node in a hierarchal tree having a plurality of nodes, the hierarchical tree arranged in a plurality of levels. According to one aspect, the method includes obtaining a first limit condition from a higher level node of the plurality of nodes in the hierarchal tree, generating the identifier, applying a function to the generated identifier, verifying that an output of the function satisfies the limit condition, determining a second limit condition for at least one lower level node of the plurality of nodes in the hierarchal tree, and sending the second limit condition to the at least one lower level node of the plurality of nodes in the hierarchal tree.

According to this aspect, in some embodiments, the identifier is generated randomly. In some embodiments, when the output of the function satisfies the limit condition, the method further includes identifying the generated identifier as an approved identifier. In some embodiments, the method further includes binding the approved identifier to the node. In some embodiments, when the output of the function does not satisfy the limit condition, the method further includes generating a different identifier, applying the function to the generated different identifier, and verifying that an output of the function satisfies the limit condition.

In some embodiments, the method further includes determining a unique limit condition for each node in a next lower level of the hierarchal tree. In some embodiments, the second limit condition includes the first limit condition. In some embodiments, the second limit condition is appended to the first limit condition to form a unique limit condition for each node in a next lower level of the hierarchal tree. In some embodiments, the function is a mathematical operation. In some embodiments, the function is shared with each node in the hierarchal tree upon configuration of the hierarchal tree. In some embodiments, the function is shared with the at least one lower level node of the plurality of nodes in the hierarchical tree when the second limit condition is sent to the at least one lower level node of the plurality of nodes in the hierarchal tree. In some embodiments, the second limit condition is sent to at least one lower level node in a sub branch of the node. In another embodiment, the identifier is used for at least one of a resource name, an address, and a security key associated with the node.

According to another aspect, a node for generating a unique identifier is provided. The node is configured for use within a hierarchal tree of a plurality of nodes, the hierarchical tree having a plurality of levels.

According to this aspect, in some embodiments, the node includes a communications interface, and processing circuitry in communication with the communications interface. The processing circuitry includes a processor, and a memory, the memory in communication with the processor. The memory has instructions that, when executed by the processor, configure the processor to obtain, from the communications interface, a first limit condition from a higher level node of the plurality of nodes in the hierarchal tree, generate the identifier, apply a function to the generated identifier, verify that an output of the function satisfies the limit condition, and determine a second limitation condition for at least one lower level node of the plurality of nodes in the hierarchal tree. The communication interface is configured to send the second limit condition to the at least one lower level node of the plurality of nodes of the hierarchal tree.

In some embodiments, the identifier is generated randomly. In some embodiments, when the output of the function satisfies the limit condition, the memory further stores instructions that, when executed, configure the processor to identify the generated identifier as an approved identifier. In some embodiments, the memory further stores instructions that, when executed, configure the processor to bind the approved identifier to the node. In some embodiments, when the output of the function does not satisfy the limit condition, the memory further stores instructions that, when executed, configure the processor to generate a different identifier, apply the function to the generated different identifier, and verify that an output of the function satisfies the limit condition.

In some embodiments, the memory further stores instructions that, when executed, configure the processor to determine a unique limit condition for each node in a next lower level of the hierarchal tree. In some embodiments, the second limit condition includes the first limit condition. In some embodiments, the second limit condition is appended to the first limit condition to form a unique limit condition for each node in a next lower level of the hierarchal tree. In some embodiments, the function is a mathematical operation. In some embodiments, the function is shared with each node in the hierarchal tree upon configuration of the hierarchal tree. In some embodiments, the function is shared with the at least one lower level node of the plurality of nodes in the hierarchical tree when the second limit condition is sent to the at least one lower level node of the plurality of nodes in the hierarchal tree. In some embodiments, the second limit condition is sent to at least one lower level node in a sub branch of the node. In some embodiments, the identifier is used for at least one of a resource name, an address, and a security key associated with the node.

According to another aspect, a method, at an identifier authorizing entity, for generating a unique identifier at a node in a hierarchal tree having a plurality of nodes, the hierarchical tree arranged in a plurality of levels, is provided. The method includes assigning an identifier to a root note of the plurality of nodes in the hierarchal tree, assigning a first limit condition to at least one lower level node of the plurality of nodes in the hierarchal tree, generating the identifier for the at least one lower level node of the plurality of nodes in the hierarchal tree, applying a function to the generated identifier, verifying that an output of the function satisfies the first limit condition, assigning a second limit condition to at least one lower level node of the plurality of nodes in the hierarchal tree, and sending the second limit condition to the at least one lower level node of the plurality of nodes in the hierarchal tree.

According to this aspect, in some embodiments, when the output of the function satisfies the limit condition, the method further includes identifying the generated identifier as an approved identifier. In some embodiments, when the output of the function does not satisfy the limit condition, the method further includes generating a different identifier, applying the function to the generated different identifier, and verifying that an output of the function satisfies the limit condition.

In some embodiments, the method further includes assigning a unique limit condition for each node in a next lower level of the hierarchal tree. In some embodiments, the second limit condition includes the first limit condition. In some embodiments, the function is shared with each node in the hierarchal tree upon configuration of the hierarchal tree. In some embodiments, the function is shared with the at least one node of the plurality of nodes at a lower level than the at least one lower level node of the plurality of nodes in the hierarchical tree when the second limit condition is sent to the at least one node of the plurality of nodes at a lower level than the at least one lower level node of the plurality of nodes in the hierarchical tree. In some embodiments, the identifier is used for at least one of a resource name, an address, and a security key associated with the at least one lower level node of the plurality of nodes in the hierarchal tree.

According to another aspect, an identifier authorizing entity for generating a unique identifier at a node in a hierarchal tree having a plurality of nodes, the hierarchical tree arranged in a plurality of levels, is provided. The identifier authorizing entity includes a communications interface, and processing circuitry in communication with the communications interface. The processing circuitry includes a processor, and a memory, the memory in communication with the processor. The memory has instructions that, when executed by the processor, configure the processor to assign an identifier to a root note of the plurality of nodes in the hierarchal tree, assign a first limit condition to at least one lower level node of the plurality of nodes in the hierarchal tree, generate the identifier for the at least one lower level node of the plurality of nodes in the hierarchal tree, apply a function to the generated identifier, verify that an output of the function satisfies the first limit condition, and assign a second limit condition to at least one lower level node of the plurality of nodes in the hierarchal tree. The communications interface is configured to send the second limit condition to the at least one lower level node of the plurality of nodes in the hierarchal tree.

According to this aspect, when the output of the function satisfies the limit condition, the memory further stores instructions that, when executed, configure the processor to identify the generated identifier as an approved identifier. In some embodiments, when the output of the function does not satisfy the limit condition, the memory further stores instructions that, when executed, configure the processor to generate a different identifier, apply the function to the generated different identifier, and verify that an output of the function satisfies the limit condition.

In some embodiments, the memory further stores instructions that, when executed, configure the processor to assign a unique limit condition for each node in a next lower level of the hierarchal tree. In some embodiments, the second limit condition includes the first limit condition. In some embodiments, the function is shared with each node in the hierarchal tree upon configuration of the hierarchal tree.

In some embodiments, the function is shared with the at least one node of the plurality of nodes at a lower level than the at least one lower level node of the plurality of nodes in the hierarchical tree when the second limit condition is sent to the at least one node of the plurality of nodes at a lower level than the at least one lower level node of the plurality of nodes in the hierarchical tree. In some embodiments, the identifier is used for at least one of a resource name, an address, and a security key associated with the at least one lower level node of the plurality of nodes in the hierarchal tree.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
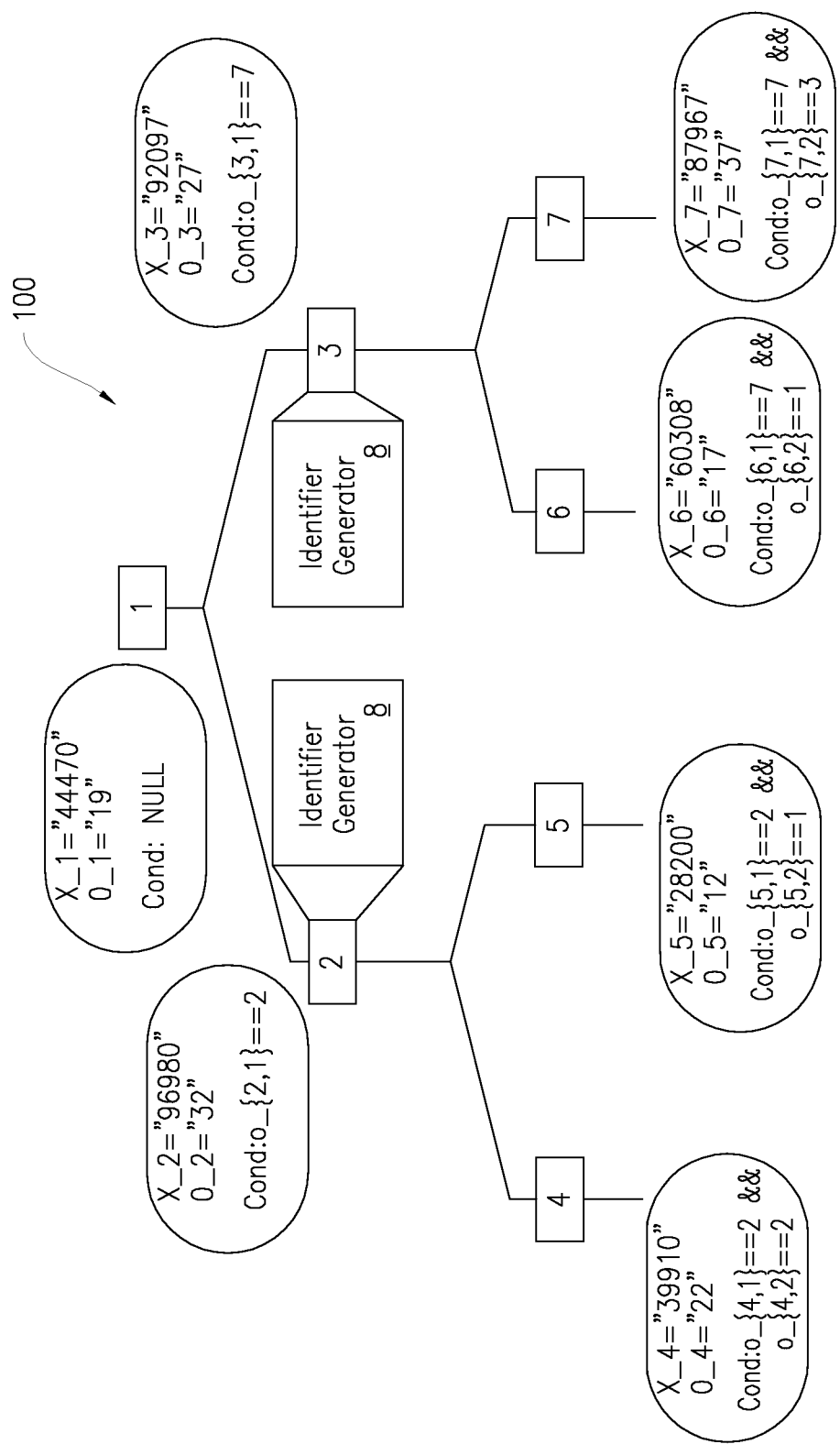
FIG. 1 is a diagram of a hierarchal tree having a plurality of nodes and levels in accordance with the principles of the present disclosure.

Before describing in detail exemplary embodiments, it is noted that the embodiments reside primarily in combinations of apparatus components and processing steps related to the self-generation of identifiers in nodes of a hierarchal tree that are unique across domains. The present disclosure provides an identifier generation methodology that can be incorporated in a node of the hierarchal tree or a separate identifier authorizing entity and that recursively allocates non-overlapping limit conditions to nodes on branches of a hierarchal tree to ensure that unique identifiers are generated for each node of the hierarchal tree.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The present disclosure provides a method, occurring for example at a node in a hierarchal tree, to generate unique identifiers within a domain in order to reduce the likelihood of collision and duplication of identifiers. One or more "limit conditions" are imposed upon the identifier and only if these limit conditions are met does the identifier become a valid and approved identifier. In order to determine if the limit condition is met, a function is chosen and applied to the candidate identifier to produce an output. The output is then compared to the limit condition. If the output satisfies the imposed limit condition, then the identifier is considered valid and approved. The node can then create a second limit condition and pass that second limit condition down to a lower level node in the hierarchal tree, and the process continues until all nodes have generated unique identifiers.

Thus, in an embodiment, a first limit condition may be obtained by a node from a higher level node of a plurality of nodes in a hierarchal tree. A candidate identifier is generated and a function applied to the generated identifier. It is then determined if the output of the function satisfies the limit condition. If so, the node generates a second limit condition for at least one lower level node in the hierarchal tree, and sends the second limit condition to the lower level node. In some instances, the first condition can be combined with the second condition.

In some embodiments, the present disclosure provides an IdentifierGenerator function that receives the limit condition described above. As discussed above, the limit condition is compared to the output of a function that has been applied to the candidate identifier. The candidate identifier is generated by the IdentifierGenerator function. The present disclosure also provides a "GetBranchConditionFromIdentifier" function as an input. In some embodiments (i.e., a single-function-for-all embodiment), the GetBranchConditionFromIdentifier function could be assumed to be a common function shared among all devices nodes involved and therefore not passed via the inputs.

The IdentifierGenerator function is equipped with a Pseudo-Random Generator. The Pseudo-Random Generator is configured to generate "strings" that could be identifier candidates. The strings are considered to be generated using draws from an "alphabet" set. The "letters" of the alphabet are not required to be encoded using traditional 8-bit placeholders. Other encodings, such as that of the 5-bit Matin Encoding and Naming implementation could be also considered. It should be noted that the "alphabet" need not be limited to a linguistic-oriented alphabet and can include alphanumeric characters.

In some embodiments, the IdentifierGenerator function is also equipped with a CheckBranchConditionCompliance function. This function receives the output of the GetBranchConditionFromIdentifier function on a candidate string and also a limit condition, and then determines whether or not the proposed string complies with the limit condition.

For each instance the IdentifierGenerator function is called, the function starts a process called GenerateAComplyingIdentifier process. In this process, the Pseudo-Random dom Generator is called iteratively followed by applying the GetBranchConditionFromIdentifier function on every generated string by the generator. The GenerateAComplyingIdentifier process stops when the output of the GetBranchConditionFromIdentifier function matches the "limit condition" input of the function, via the CheckBranchConditionCompliance function. Then, the IdentifierGenerator function returns the complying string as its output key.

In some embodiments, the GetBranchConditionFromIdentifier function could be a "summary" function of a string. For example, suppose a 2048 bit string is considered. The Key Limited function could be a sum of each 32-bit digit modulo $2^{37}$. The choice of 37 is exemplary and other choices may be used. The result is that $2^{37}=137,438,953,472$, which provides more than 100 billion non-overlapping domains and provides a randomness of $(2048-37)=2\Lambda2011$ within each domain, where the domain can be a device or a set of devices. Within the domain, 2011 is expected to remain a large enough number in order to make the probability for collision low.

In some embodiments, the CheckBranchConditionCompliance function described above does not enforce the "exact" match between the calculated limit "value" of a candidate string and the to-be-enforced limit value. In other words, a limit condition could be set, for example, at 25, in the context of the GetBranchConditionFromIdentifier function, meaning that the two right-hand side digits of the sum should be "2" and "5" while not enforcing any conditions on the other digits of the sum output.

In an alternate embodiment of the present disclosure, the overload of naïve convergence to a complying identifier, as described above, is reduced as described as follows. In a modification of the GenerateAComplyingIdentifier process, the required key "template" (where the key template is of a specific length, for example, 256 bits) is considered to be divided in two segments. The first, longer segment is generated randomly using the Pseudo-Random Generator described above without imposing any conditions. Then, the second, shorter segment, known as the "tweaker" is initiated (in one embodiment using the same Pseudo-Random Generator). The limit condition of the combined key, i.e., the two segments concatenated and put together, is calculated using the GetBranchConditionFromIdentifier function as discussed above. Then, if the calculated limit does not match the required limit condition, the tweaker is modified until the whole key complies with the required limit condition. In one embodiment, the modifications could be in the form of random re-generation of the tweaker. Depending on the nature of the GetBranchConditionFromIdentifier function, the difference in the limit value of the combined segment and that that is required could be injected in the tweaker.

In case the GetBranchConditionFromIdentifier function is transitive in the sense that the limit value of the combined segment is equal to the sum of those of the segments themselves, the process could be focused on matching the differential limit value of the tweaker in order to avoid recalculating the limit value of the whole, key, which could be very long. In this fashion, a fast convergence time is ensured.

In case the GetBranchConditionFromIdentifier function is not sensitive to the actual position of "letters" along the key string, the long segment and also the tweaker (i.e., the short segment) could be shuffled together in a random way at the end before returning the complying identifier.

The implementation of the present disclosure requires an agreement among the involved parties regarding how to design a hierarchal tree of branches and sub-branches where the limits are set in a consistent and non-blocking manner. For example, the top level of the tree could have as many branches as the number of letters in the alphabet used to generate the limit values. For the purpose of simplicity, it is assumed that the same alphabet has been used in representing both the identifier and also the limits. In other words, it is assumed that the limit values are also strings of letters from the same alphabet as that of the keys.

In name-based approaches to networking and also management of virtualized identifier, the requirement for having unique names has resulted in using random strings as names and IDs. The usage of names may be handled in the same way as keys. A challenge with this approach is that the names would be not human-readable, and therefore the traditional approach of a human supervising of the processes and operations has gradually faded out.

Although the present disclosure could be used as an alternative solution that not only allows the operators to choose names with their preferred templates, it also enforces uniqueness because of its non-overlapping limit structure. In this sense, even the most isolated and local development of a system could seamlessly be integrated with the rest of the world because the names are forced to satisfy a complying condition on their calculated limit values.

One difference of the current embodiments when compared to the use of keys is that names are not assumed to be kept private. It is worth mentioning that the present disclosure removes the requirement on the names from an explicit structure and letters to implicit requirements on calculated limit values using GetBranchConditionFromIdentifier functions and adds another layer of resiliency to operations because of the inference of what has been the limit. Also, what had been the GetBranchConditionFromIdentifier function (in cases that non-standard functions are used) would be highly difficult considering that only a few sample names would be available to the attacker.

The case of IP addresses may include some means of binding a key string to an address prefix for IPv4 and IPv6. This would be done at least at the domain level. A process that identifies collisions within a domain is considered. This refers to the 219/256 of modulo 2 possible devices within a domain Two segments are partitioned as part of the 219 set of combinations. If, for example, 30/219 is considered for the Segment-2 (~1 billion of table entries), a simple table can be used that is based on the sequencing of serial numbers to detect collision in a logically centralized table (i.e., one per domain) management entity. There will be <1 billion devices per domain. Thus, since the Segment-2 table can sustain approximately 1 billion entries, the Segment-2 table can be checked for repeat entries.

A method is described herein to identify the randomness of Unique Names overlapping. An identifier/processing device is described to support the UniqueRandomString generation. For that purpose, a device that includes an embedded micro-processor will include a limited code-set and a minimal integrated memory (e.g. 1 MB flash, etc.). This embedded sub-system provides external interface(s) to a network-of-things. The external interface(s) may vary in type with respect to the device, e.g. Radio Frequency ("RF") loop, Universal Asynchronous Receiver/Transmitter ("UART"), Universal Synchronous/Asynchronous Receiver/Transmitter ("USART"), etc. The microcontroller benefits from a program that provides a series of possible intelligent communication between the device and the network-of things.

The same techniques proposed herein could be used for function-based encryption of messages. The case of an overlaying additional authority tree on a sub-tree (induced by the branch or sub-branch that leads that sub-tree) enables imposing an additional (in one embodiment, "private'") GetBranchConditionFromIdentifier function imposed on that sub-tree. This additional function does not replace the default GetBranchConditionFromIdentifier function and its associated branch conditions. The new private function and its associated branch conditions may be imposed as additional requirements on the identifiers of the sub-tree.

Specific Use Case

FIG. 1 illustrates a specific use case to aid understanding of the present disclosure. The use case illustrated in FIG. 1 and described below is an exemplary application of the methods and arrangements of the present disclosure described herein. The values, number of nodes, as well as the number of hierarchal levels shown in FIG. 1 are exemplary only and it is within the scope of the present disclosure to provide a hierarchal tree having more or fewer nodes, and more or fewer hierarchal levels than what is shown in FIG. 1. Thus, the specific values, the number of nodes, and the number of hierarchal levels in hierarchal tree 100 shown in FIG. 1 should not limit the present disclosure in any way.

FIG. 1 illustrates a hierarchal tree 100 that includes a series of nodes including a root node 1, first hierarchal level nodes 2 and 3 and second hierarchal level nodes 4, 5, 6 and 7. The term "node" will be used herein to refer to a network node and/or a network capable wireless device. The network node herein can be the serving network node of the wireless device or any network node with which the wireless device can establish or maintain a communication link and/or receive information, e.g., via broadcast channel. For example, the nodes depicted in FIG. 1 and described herein can be any kind of network node which may include a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., Mobile Management Entity (MME), Self-Organizing Network (SON) node, a coordinating node, positioning node, Minimization of Drive Tests (MDT) node, etc.), or even an external node (e.g., 3rd party node, a node external to the current network), wireless access point, etc. Note that herein a base station is but one example of a node. Implementations are not limited solely to base stations.

As noted above, in other embodiments of the present disclosure, the term "node" may refer to any network capable device, for example, a wired network device such as wired a machine type communication (MTC) device, or a wireless device, such as a user equipment (UE). However, the nodes described herein need not be limited to a UE. The nodes may be any type of device that is configured or configurable for communication through wired and/or wireless communication. Examples of such nodes are sensors, modems, smart phones, MTC devices also known as machine to machine (M2M) devices, personal data assistants (PDAs), iPADs, Tablets, smart phones, laptop embedded equipped (LEE), laptop mounted equipment (LME), USB dongles, etc.

Initial Assumptions

The alphabet that is used in the following example is the set of digits, i.e., Alphabet={0, 1, . . . , 8, 9}, which can be encoded in a 4-bit binary structure. For example, digit 5 is encoded as 0101. However, for the purpose of this example, the bit-level encoding will not be referred to. Instead, the alphabet includes 10 "letters." It is assumed that an identifier, in this case the name of the identifier, is a "sequence" of letters with a fixed length of 5 letters, i.e., $X=(x\_1, x\_2, x\_5)$, where $x\_i$ \in Alphabet, $i=1, \ldots, 5$. An identifier name is also shown in the string from: "$x\_1x\_2x\_3x\_4x\_5$". For example, an identifier name "50923" is equal to X=(5, 0, 9, 2, 3).

The "Function" is a string operation (such as a mathematical operation) to be applied to the identifier name. The function can be any string operation and implementations of the disclosure are not limit to the function used in FIG. 1. For the example illustrated in FIG. 1, the Function is defined to be an "addition" function applied to the letters of the identifier name. In some embodiments, the Function can be shared with all nodes in the tree on initial configuration or, alternatively, can be distributed down the tree at the same time as the condition(s). In this example, the same Function is used throughout the entire tree to facilitate uniqueness. In other embodiments, different Functions can be used throughout the tree. Thus, it is not mandatory to use a single Function for the entire tree, as long as the first-level of sub-branches are unique.

In the use based example of FIG. 1, Function(X)=sum ($x\_i$, $i=1, 5$). The "primitive" output of the Function(X) is a "number" in the decimal hex base. For example, for the identifier name X="50923", the output O=19 (i.e. 5+0+9+2+3=19). This output may be interpreted as a "string" considering each "digit" of the output number as a "letter" from the Alphabet. The string is read from right to left. In the example of X="50923", O="19", i.e., $o\_1=9$ and $o\_2=1$. In another example, if X="96980", then $x\_1=9$, $x\_2=6$, $x\_3=9$, $X\_4=8$, and $x\_5=0$. Then, sum ($x\_i$, j=1, 5)=32. Then, the final output of the O=Function(X)=32. The letters are read from right to left: O_1="2" and O_2="3", and so on. If more letters are required, i.e., if O_3 is looked for in the previous example, it does not exist. The procedure assumes a preset (for example, the letter "0") in those cases. It is also assumed that, in this embodiment, the "identifier authority" entity is one of the nodes depicted in FIG. 1, i.e., one of the first hierarchal level nodes 2 and 3. In other embodiments, a separate node or entity, i.e., a node not depicted in FIG. 1, assumes the role of the "identifier authority" entity. An example of the latter is described below with reference to FIG. 5.

Referring again to FIG. 1, a root node 1 of hierarchal tree 100 starts by assigning an identifier name to itself without any condition(s) to be satisfied. The identifier name can be generated randomly, pseudo-randomly, etc. As an example, it is assumed that $X\_1$="44470", where index 1 is the index of root node 1. Although there is no condition on the output of the Function on $X\_1$, it may be reported for the purpose of clarification: $O\_10$="19", i.e., $o\_\{0,1\}=9$ and $o\_\{0,2\}=1$.

There are two sub-branches (with associated nodes) originating from root node 1. One sub-branch to node 2 and another to node 3. Root node 1 assigns a first condition to node 2 and a second condition to node 3. Conditions can be generated randomly (or by root node preference), but must be unique for each branch.

For this example, the first condition ($o\_\{2,1\}==2$) is assigned to node 2 and the second condition ($o\_\{3,1\}==7$) is assigned to node 3. O_2 stands for the output of the Function applied to node 2 ($X\_2$), and O_3 stands for the output of the Function applied to node 3 ($X\_3$). Also, $o\_\{1,k\}$ are the letters of O_1 reading from right to left (least significant first). For example, $o\_\{2,5\}$ is the fifth letter in the output O_2 associated to the node $X\_2$.

Node 2 Sub Branch

It should be noted that in other embodiments, discussed in further detail below, the condition need not come from a higher node but may be assigned to a node in hierarchal tree 100 by a separate identifier authorizing entity. The identifier authorizing entity may assign a unique identifier to root node 1, assign a first limit condition to lower level nodes of in hierarchal tree 100, generate the unique identifier for the lower level nodes, apply the function to the generated identifier, and verify that an output of the function satisfies the first limit condition.

In the embodiment shown in FIG. 1, node 2 (which has sub branches that include node 4 and node 5) receives its condition from root node 1, and identifier generator 8 starts to generate (random) candidate $X\_2$ strings to find an identifier name for node 2 that satisfies the condition that it receives from root node 1. The condition is ($o\_\{2,1\}==2$), i.e., the output O_2 must have its least significant (right-most) letter set to "2". If the randomly generated candidate does not satisfy the condition, additional candidates are generated.

After as many iterations as necessary, node 2 determines an identifier name satisfying $X\_2$:

$X\_2$="96980". Applying the Function to ($X\_2$) results in 9+6+9+8+0=32. Therefore, O_2="32".

The newly generated condition for node 2 requires that the right-most letter of the Function output string "32" be a "2" (this was the condition for node 2 as assigned by root node 1). Thus, because the Function output string for node 2 is "32," the condition is satisfied.

At this point, node 2 may perform the task of the authority. Node 2 determines it has two sub-branches (leading to node 4 and node 5). Node 2 assigns the following conditions to node 4 and node 5, respectively: $(o\_\{4,1\}=2)$ $\&\&(o\_\{4,2\}=2)$ and $(o\_\{5,1\}==2)\&\&(o\_\{5,2\}==1)$. Thus, the condition for node 4 is the condition for node 2 (obtained from node 1) "appended" to this newly generated condition. i.e., the output of the Function applied to the name of node 4 will have to satisfy both conditions.

Now, node 4 can determine its identifier name based on the condition it received: $(o\_\{4,1\}==2)\&\&(o\_\{4,2\}==2)$. After multiple iterations (if necessary), node 4 arrives with a satisfying $X\_4$:

$X\_4$="39910". Applying the function to the string "39910" results in a function output of $O\_4$="22".

The newly generated condition for node 4 requires that the right-most letter of the Function output string "22" be a "2" (this was the condition for node 2 as assigned by root node 1) and the left-most letter of the Function output string "22" also be a "2" (this is the newly generated condition assigned to node 4 by node 2). Thus, because the Function output string for node 4 is "22," both conditions are satisfied.

At the same time or at a different time, node 5 comes up with x_5 that satisfies $(o\_\{5,1\}=2)\&\&(o\_\{5,2\}=1)$:

$X\_5$="28200". Applying the function to the string "28200" results in a function output of $O\_5$="12".

The newly generated condition for node 5 requires that the right-most letter of the Function output string "12" be a "2" (this was the condition for node 2 as assigned by root node 1) and the left-most letter of the Function output string "12" be a "1" (this is the newly generated condition assigned to node 5 by node 2). Thus, because the Function output string for node 4 is "12," both conditions are satisfied.

Node 3 Sub Branch

At the same time or at a different time, identifier generator 8 of node 3 (which has sub branches that include node 6 and node 7) starts to find and set the identifier name for node 3 based on the condition it received from root node 1. The condition is $(o\_\{3,1\}==7)$ (note that in this embodiment, the condition passed down from root node 1 to node 2 is different than the condition passed down from root node 1 to node 3). Node 3, after several iterations if necessary, satisfies $X\_3$:

$X\_3$="92097". Applying the function to the string "92097" results in a function output of $O\_3$="27".

The newly generated condition for node 3 requires that the right-most letter of the Function output string "27" be a "7" (this was the condition assigned by root node 1). Thus, because the Function output string for node 3 is "27," the condition is satisfied.

Node 3 can then act as the authority and assign these conditions to its sub-branches, i.e., nodes 6 and 7: $(o\_\{6,1\}==7)\&\&(o\_\{6,2\}==1)$ and $(o\_\{7,1\}==7)\&\&(o\_\{7,2\}==3)$, respectively. Note that the condition of having the right-most letter of the function output==7 was the condition passed down to node 3 from root node 1 and the condition that the second letter in from the right-most letter==1 was the new condition generated by node 3 and is being applied to node 6. Thus, the new condition generated by node 3 for node 6 can be added to or appended to the previous condition passed to node 3 from root node 1.

Thus, node 6 has been applied the condition $(o\_\{6,1\}==7)\&\&(o\_\{6,2\}==1)$. Node 6 produces, after several iterations if needed, a satisfying identifier name:

$X\_6$="60308". Applying the function to the string "60308" results in a function output of $O\_6$="17".

The newly generated condition for node 6 requires that the right-most letter of the Function output string "17" be a "7" (this was the condition that node 3 received from root node 1) and the next letter (reading right to left) of the Function output string "17" be a "1" (this is the newly generated condition assigned to node 6 by node 3 and "appended" to the condition that node 3 received from root node 1). Thus, because the Function output string for node 6 is "17", both conditions are satisfied.

The process continues for node 7 where node 7 has been applied the condition $(o\_\{7,1\}==7)\&\&(o\_\{7,2\}==3)$. The condition of having the right-most letter of the function output==7 was the condition passed down to node 3 from root node 1 and the condition that the second letter in from the right-most letter==3 was the new condition generated by node 3 and is being applied to node 7. Thus, the new condition generated by node 3 for node 7 can be added to or appended to the previous condition passed to node 3 from root node 1.

Thus, node 7 has been applied the condition $(o\_\{7,1\}==7)\&\&(o\_\{7,2\}==3)$. Node 7 produces, after several iterations if needed, a satisfying identifier name:

$X\_7$="87967". Applying the function to the string "87967" results in a function output of $O\_7$="37".

The newly generated condition for node 7 requires that the right-most letter of the Function output string "37" be a "7" (this was the condition that node 3 received from root node 1) and the next letter (reading right to left) of the Function output string "37" be a "3" (this is the newly generated condition assigned to node 7 by node 3 and "appended" to the condition that node 3 received from root node 1). Thus, because the Function output string for node 7 is "37", both conditions are satisfied.

Thus, the methodology illustrated above and in FIG. 1 can be repeated for lower level nodes in hierarchal tree 100. Therefore, when each node has generated its satisfying identifier name, it may then assign the backward compatible conditions down to its sub-branches, i.e., playing the role of "identifier generator authority" for its sub-branches. Again, as discussed above, in other embodiments, the identifier generator authority need not be any node in hierarchal tree 100 but may be some other node or entity.

In some instances, it is possible that the initial alphabet set is not sufficient to give a unique condition to each sub-branch. This may happen, for example, when a tree is dynamic, and an unpredicted number of new sub-branches are added at some point to a node. In these cases, a "virtual" level is inserted below the affected node, and one or more virtual nodes are inserted in the virtual level. Then, the sub-branches receive a two-level condition compared to their actual node. This addresses the issue where the initial alphabet set is not sufficient to give a unique condition to each sub-branch, without requiring actually replacing the alphabet.

For example, if the condition for a preexisting sub-branch with index j and at a level k is (condition_of_upper_node) $\&\&(o\_\{j,k\}==5)$, the new condition for this node may be as follows: (condition_of_upper_node)$\&\&(o\_\{j,k\}==3)\&\&$ $(o\_\{j,k+1\}==5)$, where the level k represents the virtual level and it is assumed that the virtual node above the node j has a condition $(o\_\{,k\}==3)$. For the new sub-branches, there is no pre-existing condition, and therefore both level-k and level-k+1 conditions will be assigned during this process.

In the example illustrated in FIG. 1, it is assumed that there is no node above root node 1. However, it is possible that two trees are generated independently with intention that they are to be merged but later it is decided to have the two trees work together. In these instances, a merger process may be used in which a virtual node above all the root nodes of the two trees is "inserted." This new virtual or "super" root node, which will be the root node of the merged tree, assigns conditions to the two roots in the form of forcing the first least significant (i.e., right-most) letter in the output. However, in order to avoid having to regenerate all the resource names, these new conditions are satisfied by "appending" a one or more letters at the right hand side of the resource names. In the examples above, the appended section should be of 5 letters in order to insert a single additional letter in the output. The new conditions are propagated down the trees, and each node is required to generate a satisfying appending section that satisfies the condition on their past root node. In one embodiment, the nodes may copy exactly the appended section of their past root. However, it will depend on the nature of the Get Branch Condition From Resource function.

In another embodiment, a node such as node 2 may belong to two or more independent hierarchical trees. For example, a node may be part of multiple subnets, domains, virtual private networks, etc. In such a case, the node 2 can receive limit conditions from multiple higher level nodes, e.g. one higher level node from each tree. The generated identifier must satisfy all of the limit conditions imposed by each tree/domain it is a part of. Similarly, each tree may use its own unique function for verifying that the output satisfies the limit condition.

Figure 2:
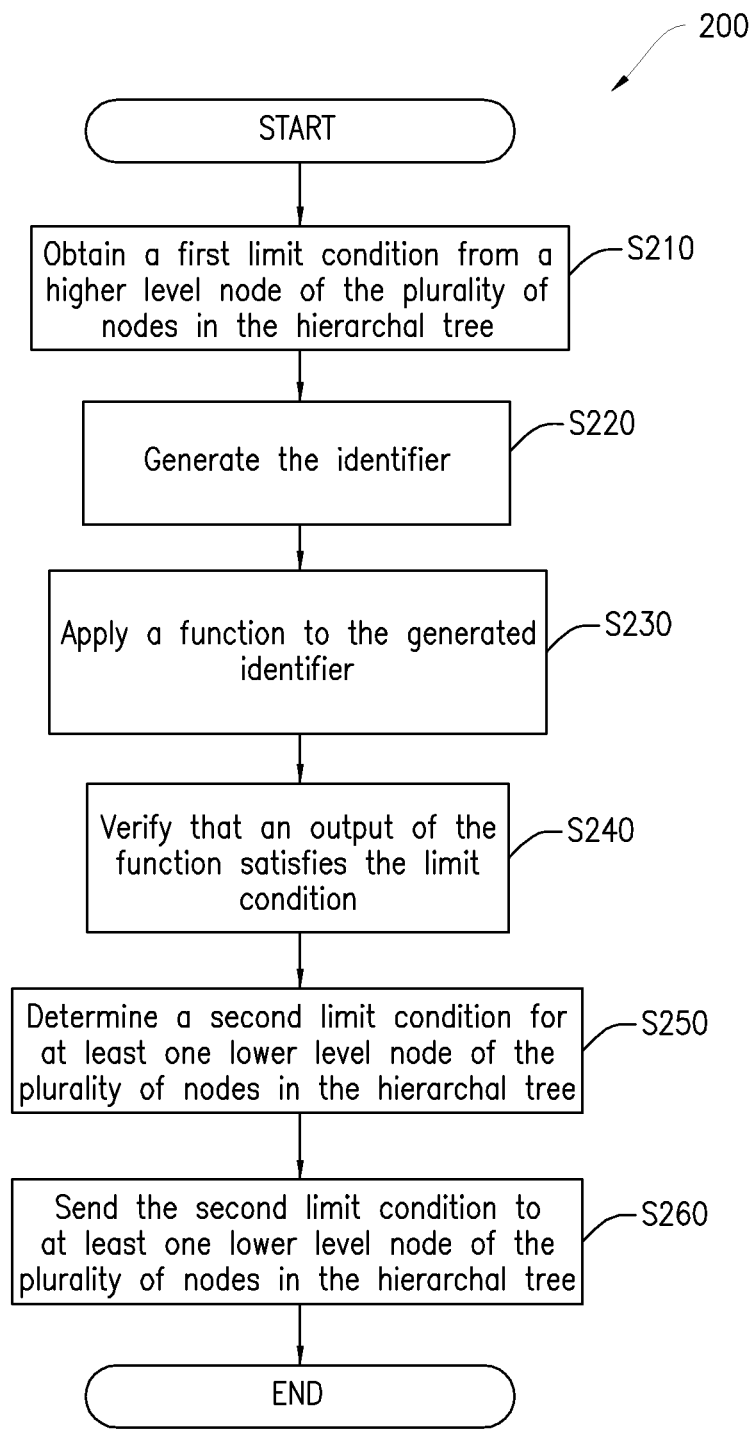
FIG. 2 is a flow diagram illustrating the steps performed by a node of a hierarchal tree for generating unique identifiers in accordance with the principles of the present disclosure.
Figure 4:
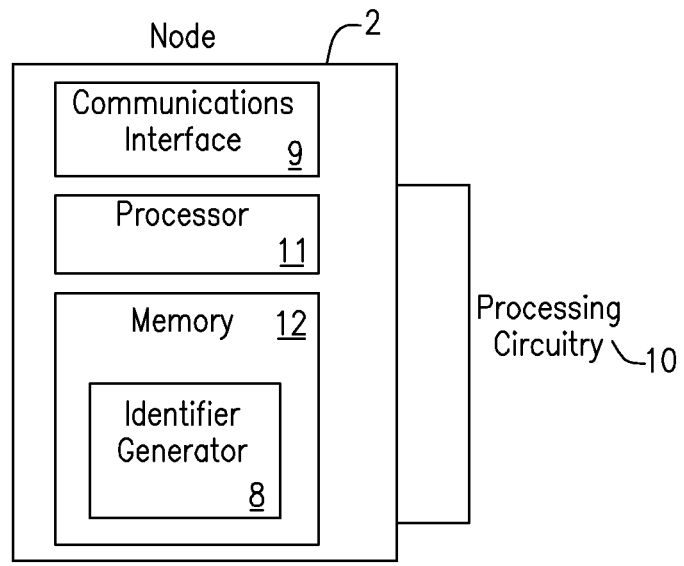
FIG. 4 is a block diagram of an exemplary network node configured to perform the functions illustrated in FIG. 2.

FIG. 2 is a flow diagram illustrating a method 200 for generating a unique identifier at a node in a hierarchal tree 100, where the hierarchal tree 100 has a plurality of nodes, and is arranged in a plurality of levels. Thus, method 200 may be performed by a node, i.e., node 2 or node 3, in tree 100, that receives a condition from a higher level node, i.e., root node 1, and passes down conditions to lower level nodes. For purposes of illustration only, it is assumed that node 2 is the node of hierarchal tree 100 performing the steps of method 200 in FIG. 2. Specifically, Blocks S210 through S250 may be performed by a processing circuitry 10 of node 2 (as shown in FIG. 4) and Block S260 may be performed by communications interface 9 of node 2 (as also shown in FIG. 4). Node 2 obtains a first limit condition from a higher level node of the plurality of nodes in hierarchal tree 100 (Block S210). For example, node 2 receives a condition from root node 1. It should be noted that as one goes further down the hierarchal tree 10, the first limit condition will become a "set" of limit conditions imposed from higher level nodes. Processing circuitry 10, and specifically, resource generator 8 generates the identifier (Block S220). Node 2 applies a function to the generated identifier (Block S230). The output of the function is compared with the limit condition and node 2 verifies that the output of the function satisfies the limit condition (Block S240). Node 2 then determines a second limit condition for at least one lower level node (i.e., node 4 or node 5) of the plurality of nodes in hierarchal tree 100 (Block S250). Node 2 sends the second limit condition to at least one lower level node (i.e., node 4 or node 5) of the plurality of nodes in the hierarchal tree 100. For example, node 2 can send the second limit condition to nodes 4 and 5 as discussed above and illustrated in FIG. 1.

In another embodiment, the identifier is generated randomly.

In another embodiment, when the output of the function satisfies the limit condition, method 200 further includes identifying the generated identifier as an approved identifier.

In another embodiment, method 200 further includes binding the approved identifier to node 2.

In another embodiment, when the output of the function does not satisfy the limit condition, method 200 further includes generating a different identifier, applying the function to the generated different identifier, and verifying that an output of the function satisfies the limit condition.

In another embodiment, method 200 further includes determining a unique limit condition for each node in a next lower level of hierarchal tree 100.

In another embodiment, the second limit condition includes the first limit condition.

In another embodiment, the second limit condition is appended to the first limit condition to form a unique limit condition for each node in a next lower level of hierarchal tree 100.

In another embodiment, the function is a mathematical operation.

In another embodiment, the function is shared with each node in hierarchal tree 100 upon configuration of hierarchal tree 100.

In another embodiment, the function is shared with the at least one lower level node of the plurality of nodes in hierarchical tree 100 when the second limit condition is sent to the at least one lower level node of the plurality of nodes in hierarchal tree 100.

In another embodiment, the second limit condition is sent to at least one lower level node in a sub branch of node 2.

In another embodiment, the identifier is used for at least one of a resource name, an address, and a security key associated with the node 2.

Figure 3:
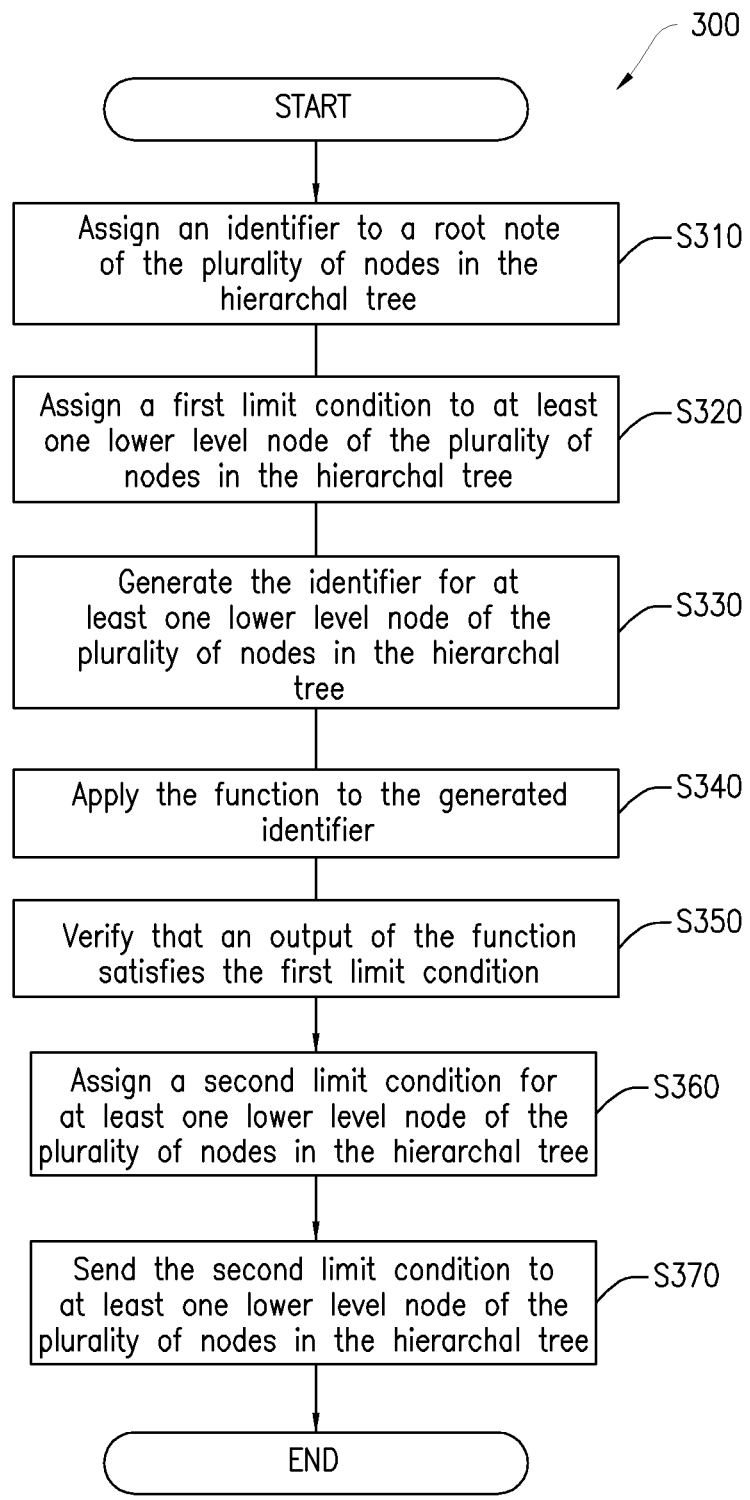
FIG. 3 is an another flow diagram illustrating steps performed by an identifier authorization entity for generating unique identifiers in accordance with the principles of the present disclosure.
Figure 5:
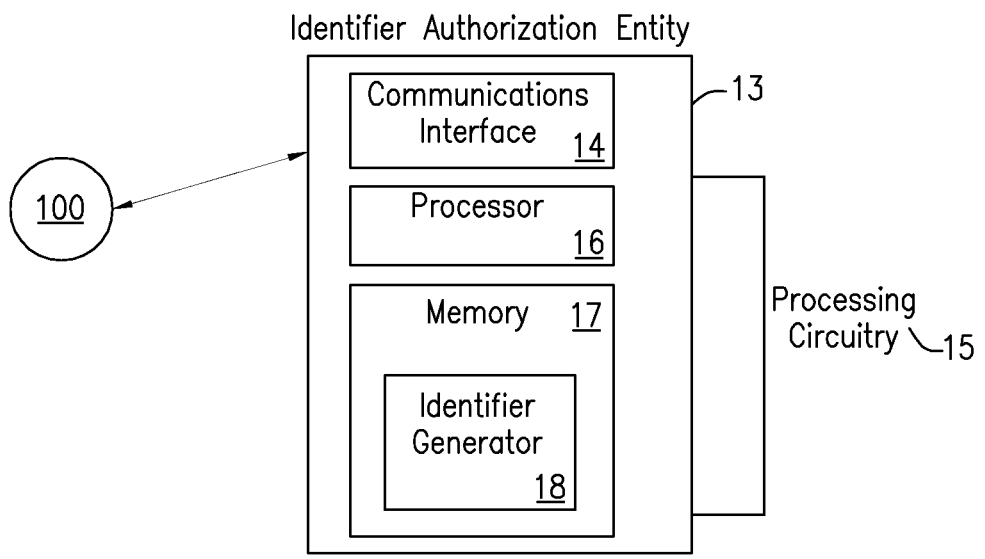
FIG. 5 is a block diagram of an exemplary identifier authorization entity configured to perform the functions illustrated in FIG. 3.

FIG. 3 illustrates another embodiment of the present disclosure where a separate identifier authorizing entity 13 (as shown in FIG. 5), other than the nodes of hierarchal tree 100 is responsible for generating a unique identifier for each of the nodes of hierarchal tree 100. Note that Blocks S310 through S360 of FIG. 3 may be performed by processing circuitry 15, and specifically, identifier generator 18 of identifier authorizing entity 13, as shown in FIG. 5. In FIG. 3, method 300 includes identifier authorizing entity 13 assigning an identifier to root node 1 of the plurality of nodes in hierarchal tree 100 (Block S310). As discussed above, root node 1 does not have any condition applied to it. Identifier authorizing entity 13 then assigns a first limit condition to at least one lower level node of the plurality of nodes of hierarchal tree 100 (Block S320). For example, the first limit condition can be assigned to node 2 or node 3 of hierarchal tree 100. Identifier authorizing entity 13 then generates an identifier for at least one lower level node (i.e., node 2 or node 3) of the plurality of nodes in hierarchal tree 1 (Block S330) and applies the function to the generated identifier (Block S340). Identifier authorizing entity 13 then verifies that an output of the function satisfies the first limit condition (Block S350) and assigns a second limit condition for at least one lower level node (i.e., node 2 or node 3) of the plurality of nodes of hierarchal tree 100 (Block S360). Communications interface 14 of identifier authorization entity 13 (seen in FIG. 5) then sends the second limit condition to at least one lower level node (i.e., node 2 or node 3) of the plurality of nodes in hierarchal tree 100 (Block S370).

In another embodiment of method 300, the identifier is generated randomly.

In another embodiment of method 300, when the output of the function satisfies the limit condition, further comprising identifying the generated identifier as an approved identifier.

In another embodiment, method 300 further includes binding the approved identifier to the node.

In another embodiment, when the output of the function does not satisfy the limit condition, method 300 further includes generating a different identifier, applying the function to the generated different identifier, and verifying that an output of the function satisfies the limit condition.

In another embodiment, method 300 further includes assigning a unique limit condition for each node in a next lower level of hierarchal tree 100.

In another embodiment of method 300, the second limit condition includes the first limit condition.

In another embodiment of method 300, the second limit condition is appended to the first limit condition to form a unique limit condition for each node in a next lower level of hierarchal tree 100.

In another embodiment of method 300, the function is a mathematical operation.

In another embodiment of method 300, the function is shared with each node in hierarchal tree 100 upon configuration of the hierarchal tree 100.

In another embodiment of method 300, the function is shared with the at least one node of the plurality of nodes at a lower level than the at least one lower level node of the plurality of nodes in hierarchical tree 100 when the second limit condition is sent to the at least one node of the plurality of nodes at a lower level than the at least one lower level node of the plurality of nodes in hierarchical tree 100.

In another embodiment, the identifier is used for at least one of a resource name, an address, and a security key associated with the node.

FIG. 4 illustrates the components of node 2. Note that again node 2 is being used as an example. FIG. 4 can also represent any other node in hierarchal tree 100 where the node is receiving a limit condition from a higher level node in tree 100 and is also sending a condition to a lower level node in tree 100 (i.e. node 3).

Node 2 is configured to generate a unique identifier, and configured for use within hierarchal tree 100 having a plurality of nodes, hierarchical tree 100 having a plurality of levels. Node 2 includes a communications interface 9, and processing circuitry 10 in communication with communications interface 9. Processing circuitry 10 includes a processor 11, and a memory 12 that is communication with processor 11. Memory 12 has instructions that, when executed by processor 11, configure processor 11 to perform a variety of functions as described herein. In addition to a traditional processor and memory, processing circuitry 10 may include integrated circuitry for processing and/or control, e.g., one or more processors and/or processor cores and/or FPGAs (Field Programmable Gate Array) and/or ASICs (Application Specific Integrated Circuitry). Processing circuitry 10 may comprise and/or be connected to and/or be configured to access (e.g., write to and/or read from) memory 12, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 12 may be configured to store code executable by control circuitry and/or other data, e.g., data pertaining to communication, e.g., configuration and/or address data of nodes, etc. Processing circuitry 10 may be configured to control any of the methods described herein and/or to cause such methods to be performed, e.g., by node 2. Corresponding instructions may be stored in the memory 12, which may be readable and/or readably connected to processing circuitry 10. In other words, processing circuitry 10 may include a controller, which may include a microprocessor and/or microcontroller and/or FPGA (Field-Programmable Gate Array) device and/or ASIC (Application Specific Integrated Circuit) device. It may be considered that processing circuitry 10 includes or may be connected or connectable to memory 12, which may be configured to be accessible for reading and/or writing by the controller and/or processing circuitry 10.

The functions performed by processor 11 include obtaining, from communications interface 9, a first limit condition from a higher level node of the plurality of nodes in hierarchal tree 100, generate the identifier, applying a function to the generated identifier, verifying that an output of the function satisfies the limit condition, and determining a second limitation condition for at least one lower level node of the plurality of nodes in hierarchal tree 100. Communication interface 9 is configured to send the second limit condition to the at least one lower level node of the plurality of nodes of hierarchal tree 100. In one embodiment, identifier generator 8 in memory 12 either alone or in conjunction with processor 11 performs the task of generating the identifier.

In another embodiment of node 2, the identifier is generated randomly. Node 2 may depend upon a random or pseudo-random number generator which, in some embodiments, could be a separate physical device, e.g., integrated circuit chip, or a circuit collocated with the processor on the processor chip. Thus, software code for the random generation of the identifier need not be located solely within memory 12. In some embodiments, the number generator element may be used, for example, to implement the IdentifierGenerator function.

In another embodiment of node 2, when the output of the function satisfies the limit condition, memory 12 further stores instructions that, when executed, configure processor 11 to identify the generated identifier as an approved identifier.

In another embodiment of node 2, memory 12 further stores instructions that, when executed, configure processor 12 to bind the approved identifier to node 2.

In another embodiment of node 2, when the output of the function does not satisfy the limit condition, memory 12 further stores instructions that, when executed, configure processor 11 to generate a different identifier, apply the function to the generated different identifier, and verify that an output of the function satisfies the limit condition.

In another embodiment of node 2, memory 12 further stores instructions that, when executed, configure processor 11 to determine a unique limit condition for each node in a next lower level of hierarchal tree 100

In another embodiment of node 2, the second limit condition includes the first limit condition.

In another embodiment of node 2, the second limit condition is appended to the first limit condition to form a unique limit condition for each node in a next lower level of hierarchal tree 100.

In another embodiment of node 2, the function is a mathematical operation.

In another embodiment of node 2, the function is shared with each node in the hierarchal tree 100 upon configuration of hierarchal tree 100.

In another embodiment of node 2, the function is shared with the at least one lower level node of the plurality of nodes in hierarchical tree 100 when the second limit condition is sent to the at least one lower level node of the plurality of nodes in hierarchal tree 100.

In another embodiment of node 2, the second limit condition is sent to at least one lower level node in a sub branch of node 2.

In another embodiment of node 2, the identifier is used for at least one of a resource name, an address, and a security key associated with the node 2.

FIG. 5 illustrates another embodiment of the present disclosure where a separate identifier authorizing entity 13, other than one of the nodes of hierarchal tree 100 is responsible for generating a unique identifier for each of the nodes of hierarchal tree 100. Authorizing entity 13 may depend upon a random or pseudo-random number generator which, in some embodiments, could be a separate physical device, e.g., integrated circuit chip, or a circuit collocated with the processor on the processor chip. Thus, software code for the random generation of the identifier need not be located solely within memory 17 of authorizing entity 13. In some embodiments, the number generator element may be used, for example, to implement the IdentifierGenerator function.

Identifier authorizing entity 13 is configured to generate a unique identifier at a node in hierarchal tree 100 having a plurality of nodes, where hierarchical tree 100 is arranged in a plurality of levels. Identifier authorizing entity 13 includes a communications interface 14 and processing circuitry 15 in communication with communications interface 14. Processing circuitry 10 includes a processor 16 and a memory 17, where memory 17 is in communication with processor 16. Memory 17 has instructions that, when executed by processor 16, configure processor 16 to perform a variety of functions. These functions may include assigning an identifier to root node 1 of the plurality of nodes in hierarchal tree 100, assigning a first limit condition to at least one lower level node of the plurality of nodes in hierarchal tree 100, generating the identifier for the at least one lower level node of the plurality of nodes in hierarchal tree 100, applying a function to the generated identifier, verifying that an output of the function satisfies the first limit condition, and assigning a second limit condition to at least one lower level node of the plurality of nodes in hierarchal tree 100. Communications interface 14 is configured to send the second limit condition to the at least one lower level node of the plurality of nodes in hierarchal tree 100. In one embodiment, identifier generator 18 in memory 17 either alone or in conjunction with processor 16 performs the task of generating the identifier.

In another embodiment of identifier authorizing entity 13, the identifier is generated randomly.

In another embodiment of identifier authorizing entity 13, when the output of the function satisfies the limit condition, memory 17 further stores instructions that, when executed, configure processor 16 to identify the generated identifier as an approved identifier.

In another embodiment of identifier authorizing entity 13, memory 17 further stores instructions that, when executed, configure processor 16 to bind the approved identifier to the node.

In another embodiment of identifier authorizing entity 13, when the output of the function does not satisfy the limit condition, memory 17 further stores instructions that, when executed, configure processor 16 to generate a different identifier, apply the function to the generated different identifier, and verify that an output of the function satisfies the limit condition.

In another embodiment of identifier authorizing entity 13, memory 17 further stores instructions that, when executed, configure processor 16 to assign a unique limit condition for each node in a next lower level of hierarchal tree 100.

In another embodiment of identifier authorizing entity 13, the second limit condition includes the first limit condition.

In another embodiment of identifier authorizing entity 13, the second limit condition is appended to the first limit condition to form a unique limit condition for each node in a next lower level of hierarchal tree 100.

In another embodiment of identifier authorizing entity 13, the function is a mathematical operation.

In another embodiment of identifier authorizing entity 13, the function is shared with each node in hierarchal tree 100 upon configuration of hierarchal tree 100.

In another embodiment of identifier authorizing entity 13, the function is shared with the at least one node of the plurality of nodes at a lower level than the at least one lower level node of the plurality of nodes in hierarchical tree 100 when the second limit condition is sent to the at least one node of the plurality of nodes at a lower level than the at least one lower level node of the plurality of nodes in hierarchical tree 100.

In another embodiment of identifier authorizing entity 13, the identifier is used for at least one of a resource name, an address, and a security key associated with the at least one lower level node of the plurality of nodes in the hierarchal tree 100.

Figure 6:
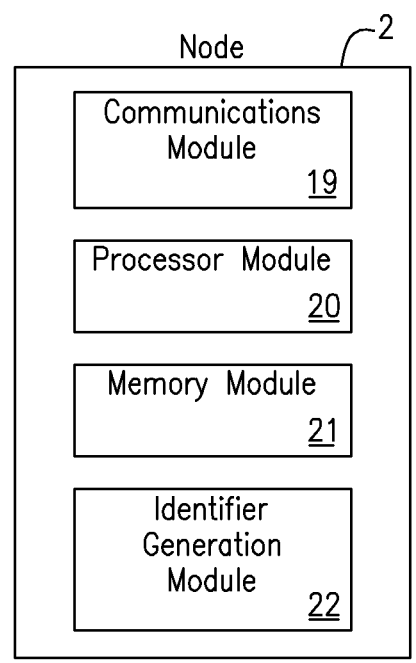
FIG. 6 is a block diagram of another exemplary network node configured to generate unique identifiers in accordance with the principles of the present disclosure.

FIG. 6 illustrates yet another embodiment of node 2, where node 2 is configured to generate a unique identifier, where node 2 is configured for use within hierarchal tree 100 of a plurality of nodes, where hierarchical tree 100 also has a plurality of levels. Node 2 includes a communications module 19, a processor module 20 in communication with the communications module 19, and a memory module 21 in communication with the processor module 20, memory module 20 having instructions that, when executed by processor module 20, configure processor module 20 to perform a variety of functions. These functions may include obtaining, from communications module 20, a first limit condition from a higher level node of the plurality of nodes in hierarchal tree 100, generating the identifier, applying a function to the generated identifier, and verifying that an output of the function satisfies the limit condition, and determining a second limitation condition for at least one lower level node of the plurality of nodes in hierarchal tree 100. Communication module 19 is configured to send the second limit condition to the at least one lower level node of the plurality of nodes of hierarchal tree 100. In one embodiment, identifier generation module 22 may, either alone, or in conjunction with processor module 20 perform the task of generating the identifier.

Abbreviations

Alphabet—A finite set of letters along with an encoding table that associates each letter to a sequence of binary values.

Letter—A member of an alphabet set. The letter would encode to a sequence of bits according to the encoding table of the alphabet.

Identifier—An artifact or thing represented by its name, identification (ID), internet protocol (IP) address, etc. It is assumed that an identifier can be represented in the form of a string of letters from a selected alphabet.

Branch—A branch (domain) in the hierarchy of the authority with its assigned "branch condition."

Sub Branch—A branch that is not directly connected to the root of the authority.

Branch Condition—A condition that all resources (or sub branches) of a particular branch should satisfy.

GetBranchConditionFromIdentifier function—A unique function across an instance of an authority tree that calculates a condition value from an identifier to be later matched with the associated branch condition.

Authority or Hierarchal Tree—An authority (for example, Internet Corporation for Assigned Names and Numbers (ICANN), which may serve as the "root" of the tree, plus the branches and sub-branches connected recursively to the root. Each branch receives a designated "branch condition: from the root. Each branch (or sub branch) delegates a unique "consistent" branch condition to each one of its sub branches. All branch conditions are matched against a single GetBranchConditionFromResource function that is imposed by the authority on the whole tree. However, a branch (or sub branch) is eligible to impose an 'additional" (in some instances, private) Get Branch Condition From Resource function on its delegated sub branches (along with their own branch conditions associated with the private Get Branch Condition From Resource function imposed).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for generating a unique identifier at a node in a hierarchal tree having a plurality of nodes, each node of the plurality of nodes being a unique network node, the hierarchical tree arranged in a plurality of levels, the method comprising:

obtaining a first limit condition from a higher level node of the plurality of nodes in the hierarchal tree;

generating the identifier;

applying a function to the generated identifier;

verifying that an output of the function satisfies the limit condition;

determining a second limit condition for at least one lower level node of the plurality of nodes in the hierarchal tree, the second limit condition being different from the first limit condition; and sending the second limit condition to the at least one lower level node of the plurality of nodes in the hierarchal tree.

2. The method of claim 1, wherein the identifier is generated randomly.

3. The method of claim 1, wherein when the output of the function satisfies the limit condition, further comprising identifying the generated identifier as an approved identifier.

4. The method of claim 3, further comprising binding the approved identifier to the node.

5. The method of claim 1, wherein when the output of the function does not satisfy the limit condition, further comprising:
generating a different identifier;
applying the function to the generated different identifier; and
verifying that an output of the function satisfies the limit condition.

6. The method of claim 1, further comprising determining a unique limit condition for each node in a next lower level of the hierarchal tree.

7. The method of claim 1, wherein the second limit condition includes the first limit condition.

8. The method of claim 7, wherein the second limit condition is appended to the first limit condition to form a unique limit condition for each node in a next lower level of the hierarchal tree.

9. The method of claim 1, wherein the function is shared with each node in the hierarchal tree upon configuration of the hierarchal tree.

10. The method of claim 1, wherein the function is shared with the at least one lower level node of the plurality of nodes in the hierarchical tree when the second limit condition is sent to the at least one lower level node of the plurality of nodes in the hierarchal tree.

11. The method of claim 1, wherein the second limit condition is sent to at least one lower level node in a sub branch of the node.

12. A node for generating a unique identifier, the node configured for use within a hierarchal tree of a plurality of nodes, each node of the plurality of nodes being a unique network node, the hierarchical tree having a plurality of levels, the node comprising:
a communications interface; and
processing circuitry in communication with the communications interface, the processing circuitry comprising:
a processor; and
a memory, the memory in communication with the processor, the memory having instructions that, when executed by the processor, configure the processor to:
obtain, from the communications interface, a first limit condition from a higher level node of the plurality of nodes in the hierarchal tree;
generate the identifier;
apply a function to the generated identifier;
verify that an output of the function satisfies the limit condition;
determine a second limitation condition for at least one lower level node of the plurality of nodes in the hierarchal tree, the second limit condition being different from the first limit condition; and
the communication interface configured to send the second limit condition to the at least one lower level node of the plurality of nodes of the hierarchal tree.

13. The node of claim 12, wherein the identifier is generated randomly.

14. The node of claim 12, wherein when the output of the function satisfies the limit condition, the memory further stores instructions that, when executed, configure the processor to identify the generated identifier as an approved identifier.

15. The node of claim 14, wherein the memory further stores instructions that, when executed, configure the processor to bind the approved identifier to the node.

16. The node of claim 12, wherein when the output of the function does not satisfy the limit condition, the memory further storing instructions that, when executed, configure the processor to:
generate a different identifier;
apply the function to the generated different identifier; and
verify that an output of the function satisfies the limit condition.

17. The node of claim 12, wherein the memory further stores instructions that, when executed, configure the processor to determine a unique limit condition for each node in a next lower level of the hierarchal tree.

18. The node of claim 12, wherein the second limit condition includes the first limit condition.

19. The node of claim 18 wherein the second limit condition is appended to the first limit condition to form a unique limit condition for each node in a next lower level of the hierarchal tree.

20. The node of claim 12, wherein the function is shared with each node in the hierarchal tree upon configuration of the hierarchal tree.

21. The node of claim 12, wherein the function is shared with the at least one lower level node of the plurality of nodes in the hierarchical tree when the second limit condition is sent to the at least one lower level node of the plurality of nodes in the hierarchal tree.

22. The node of claim 12, wherein the second limit condition is sent to at least one lower level node in a sub branch of the node.

23. A method, at an identifier authorizing entity, for generating a unique identifier at a node in a hierarchal tree having a plurality of nodes, each node of the plurality of nodes being a unique network node, the hierarchical tree arranged in a plurality of levels, the method comprising:
assigning an identifier to a root note of the plurality of nodes in the hierarchal tree;
assigning a first limit condition to at least one lower level node of the plurality of nodes in the hierarchal tree;
generating the identifier for the at least one lower level node of the plurality of nodes in the hierarchal tree;
applying a function to the generated identifier;
verifying that an output of the function satisfies the first limit condition;
assigning a second limit condition to at least one lower level node of the plurality of nodes in the hierarchal tree, the second limit condition being different from the first limit condition; and
sending the second limit condition to the at least one lower level node of the plurality of nodes in the hierarchal tree.

24. The method of claim 23, wherein when the output of the function satisfies the limit condition, further comprising identifying the generated identifier as an approved identifier.

25. The method of claim 23, wherein when the output of the function does not satisfy the limit condition, further comprising:
generating a different identifier;
applying the function to the generated different identifier; and verifying that an output of the function satisfies the limit condition.

26. The method of claim 23, wherein the function is shared with the at least one node of the plurality of nodes at a lower level than the at least one lower level node of the plurality of nodes in the hierarchical tree when the second limit condition is sent to the at least one node of the plurality of nodes at a lower level than the at least one lower level node of the plurality of nodes in the hierarchical tree.

27. An identifier authorizing entity for generating a unique identifier at a node in a hierarchal tree having a plurality of nodes, each node of the plurality of nodes being a unique network node, the hierarchical tree arranged in a plurality of levels, the identifier authorizing entity comprising:
   a communications interface; and
   processing circuitry in communication with the communications interface, the processing circuitry comprising:
      a processor; and
      a memory, the memory in communication with the processor, the memory having instructions that, when executed by the processor, configure the processor to:
         assign an identifier to a root node of the plurality of nodes in the hierarchal tree;
         assign a first limit condition to at least one lower level node of the plurality of nodes in the hierarchal tree;
         generate the identifier for the at least one lower level node of the plurality of nodes in the hierarchal tree;
         apply a function to the generated identifier;
         verify that an output of the function satisfies the first limit condition;
         assign a second limit condition to at least one lower level node of the plurality of nodes in the hierarchal tree, the second limit condition being different from the first limit condition; and
      the communications interface configured to send the second limit condition to the at least one lower level node of the plurality of nodes in the hierarchal tree.

28. The identifier authorizing entity of claim 27, wherein when the output of the function satisfies the limit condition, the memory further stores instructions that, when executed, configure the processor to identify the generated identifier as an approved identifier.

29. The identifier authorizing entity of claim 27, wherein when the output of the function does not satisfy the limit condition, the memory further stores instructions that, when executed, configure the processor to:
   generate a different identifier;
   apply the function to the generated different identifier; and
   verify that an output of the function satisfies the limit condition.

30. The identifier authorizing entity of claim 27, wherein the function is shared with the at least one node of the plurality of nodes at a lower level than the at least one lower level node of the plurality of nodes in the hierarchical tree when the second limit condition is sent to the at least one node of the plurality of nodes at a lower level than the at least one lower level node of the plurality of nodes in the hierarchical tree.

* * * * *